(12) United States Patent
Bagepalli et al.

(10) Patent No.: US 8,544,214 B2
(45) Date of Patent: Oct. 1, 2013

(54) WIND TURBINE TOWER ASSEMBLY AND METHOD FOR ASSEMBLING THE SAME

(75) Inventors: Bharat Sampathkumaran Bagepalli, Niskayuna, NY (US); Roman Kolar, Hendersonville, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/962,381

(22) Filed: Dec. 7, 2010

(65) Prior Publication Data

US 2011/0138721 A1    Jun. 16, 2011

(51) Int. Cl.
*E04H 12/00*    (2006.01)

(52) U.S. Cl.
USPC ............ 52/40; 52/651.01; 52/848; 248/163.1

(58) Field of Classification Search
USPC ............. 52/40, 651.01, 651.05, 848; 290/55; 248/163.1
See application file for complete search history.

(56) References Cited

U.S. PATENT DOCUMENTS

| | | | |
|---|---|---|---|
| 3,968,602 A * | 7/1976 | Mitchell | 52/40 |
| 4,184,084 A * | 1/1980 | Crehore | 290/55 |
| 4,248,025 A * | 2/1981 | Kleine et al. | 52/845 |
| 4,323,331 A | 4/1982 | Schachle et al. | |
| 4,694,630 A * | 9/1987 | McGinnis | 52/651.01 |
| 6,094,881 A * | 8/2000 | Lockwood | 52/845 |
| 6,578,339 B1 * | 6/2003 | McGinnis | 52/651.01 |
| 7,160,085 B2 | 1/2007 | de Roest | |
| 7,276,808 B2 * | 10/2007 | Weitkamp et al. | 290/55 |
| 7,464,512 B1 | 12/2008 | Perina | |
| 7,471,010 B1 | 12/2008 | Fingersh | |
| 7,735,290 B2 | 6/2010 | Arsene | |
| 7,739,843 B2 | 6/2010 | Cortina-Cordero | |
| 7,956,817 B2 * | 6/2011 | Hager | 343/890 |
| 7,993,107 B2 * | 8/2011 | Gevers | 416/244 R |
| 2008/0236073 A1 | 10/2008 | Bagepalli et al. | |
| 2009/0031639 A1 * | 2/2009 | Cortina/Cordero | 52/40 |

* cited by examiner

*Primary Examiner* — Jeanette E Chapman
*Assistant Examiner* — Daniel Kenny
(74) *Attorney, Agent, or Firm* — James McGinness; Armstrong Teasdale LLP (57) ABSTRACT

A wind turbine tower assembly includes a tubular section having a first longitudinal axis and a base section assembly including a plurality of legs. The base section assembly is configured to be assembled into a base section having the legs coupled together at an interface such that the base section has a second longitudinal axis and such that the legs are obliquely oriented relative to the second longitudinal axis at the interface, wherein the base section is configured to support the tubular section on the legs and in substantially coaxial alignment with the base section.

18 Claims, 9 Drawing Sheets

WIND TURBINE TOWER ASSEMBLY AND METHOD FOR ASSEMBLING THE SAME

BACKGROUND OF THE INVENTION

The subject matter described herein relates generally to wind turbines and, more particularly, to a wind turbine tower assembly and a method for assembling the same.

Many known wind turbines include a tower and a rotor mounted on the tower via a nacelle. The rotor includes a number of blades that facilitate converting wind energy into rotational energy. The rotor drives a generator through a gearbox via a rotor shaft, and the gearbox steps up the inherently low rotational speed of the rotor shaft such that the generator can convert the mechanical energy to electrical energy.

Taller wind turbine towers have been known to facilitate generating greater Annual Energy Production (AEP) by enabling the rotor to capture more wind shear at higher altitudes. However, these taller towers have also been known to experience increased loading. As such, many taller towers have large, tubular bases configured to withstand the increased loading (e.g., tubular bases having thicker walls and/or a larger diameter), and these large, tubular bases have been known to render the tower more difficult and expensive to manufacture, transport, assemble, and maintain. As such, it would be useful to provide a wind turbine tower with a base that is configured to withstand the increased loading of taller towers, while reducing a cost associated with manufacturing, transporting, assembling, and/or maintaining the tower.

BRIEF DESCRIPTION OF THE INVENTION

In one aspect, a wind turbine tower assembly is provided. The wind turbine tower assembly includes a tubular section having a first longitudinal axis and a base section assembly including a plurality of legs. The base section assembly is configured to be assembled into a base section having the legs coupled together at an interface such that the base section has a second longitudinal axis and such that the legs are obliquely oriented relative to the second longitudinal axis at the interface, wherein the base section is configured to support the tubular section on the legs and in substantially coaxial alignment with the base section.

In another aspect, a method for assembling a wind turbine tower is provided. The method includes providing a tubular section having a first longitudinal axis and providing a base section having a plurality of legs coupled together at an interface such that the base section has a second longitudinal axis, wherein the legs are obliquely oriented relative to the second longitudinal axis at the interface. The method further includes coupling the tubular section to the base section at the interface such that the base section and the tubular section are in substantially coaxial alignment and such that the tubular section is supported on the legs.

In a further aspect, a base section assembly for a wind turbine tower having a tubular section with a first longitudinal axis is provided. The base section assembly includes a plurality of legs. The base section assembly is configured to be assembled into a base section having the legs coupled together at an interface such that the base section has a second longitudinal axis and such that the legs are obliquely oriented relative to the second longitudinal axis at the interface, wherein the base section is configured to support the tubular section on the legs and in substantially coaxial alignment with the base section.

DETAILED DESCRIPTION OF THE INVENTION

The following detailed description describes a wind turbine tower assembly and a method for assembling the same by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to an exemplary embodiment, namely, a wind turbine tower. However, it is contemplated that this disclosure has general application to towers in a broad range of systems and in a variety of applications other than wind turbines.

Figure 1:
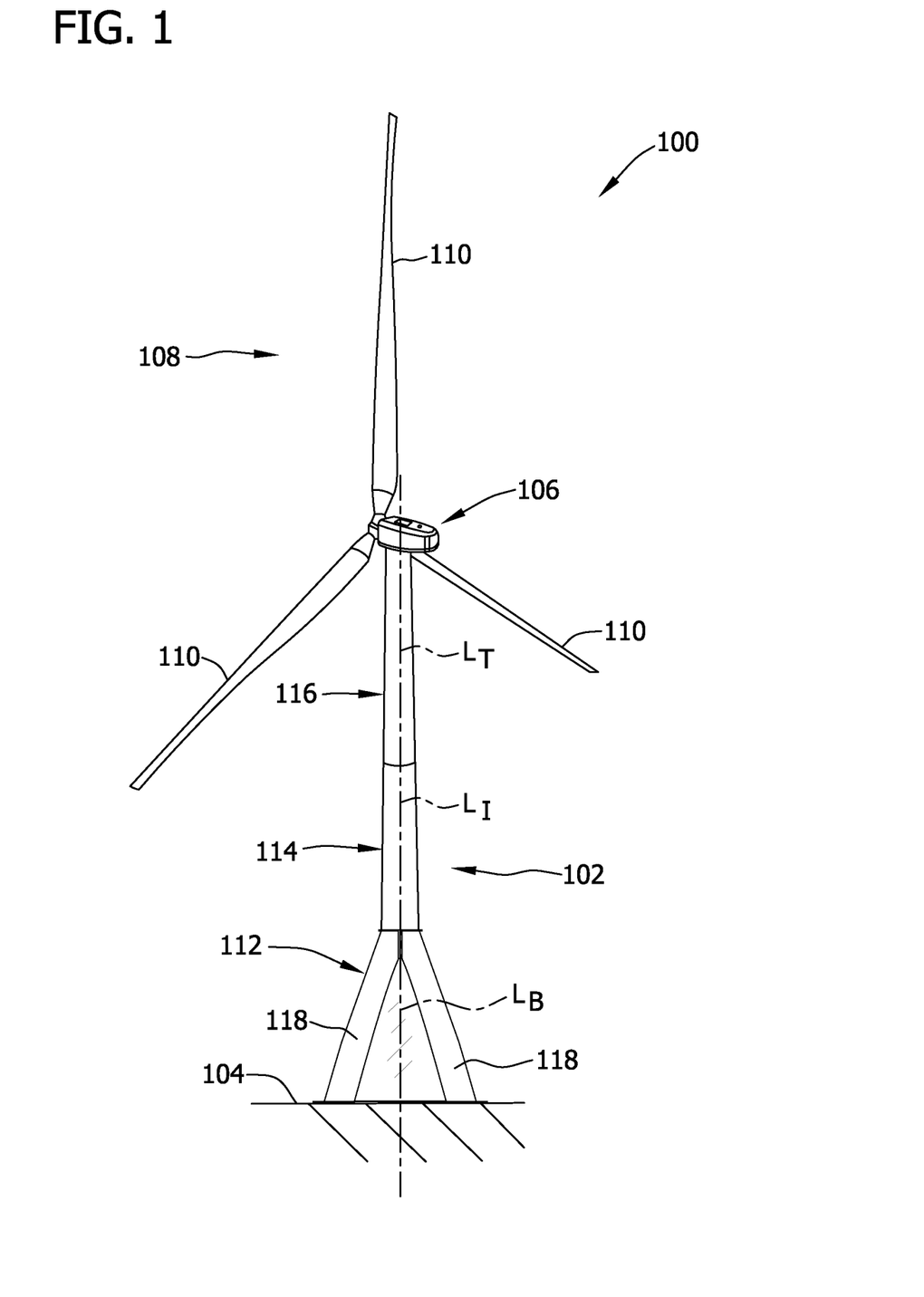
FIG. 1 is a schematic representation of an exemplary wind turbine.

FIG. 1 is a schematic representation of a wind turbine 100. In the exemplary embodiment, wind turbine 100 is a horizontal axis wind turbine. In other embodiments, wind turbine 100 may be a vertical axis wind turbine. Wind turbine 100 includes a tower 102 erected from a foundation 104 (e.g., a concrete foundation), a nacelle 106 mounted on tower 102, and a rotor 108 rotatably coupled to nacelle 106. Rotor 108 includes a plurality of blades 110.

In the exemplary embodiment, tower 102 includes a splayed base section 112 having a longitudinal axis $L_B$, at least one tubular (e.g., cylindrical or conical) intermediate section 114 having a longitudinal axis $L_I$, and a tubular (e.g., cylindrical or conical) top section 116 having a longitudinal axis $L_T$ such that base section 112, intermediate section(s) 114, and top section 116 are substantially coaxial with one another. Base section 112 includes a plurality of legs 118 mounted on foundation 104 (e.g., partially embedded within a concrete foundation using dowel pins, bosses, or tenons for alignment) and arranged in a tripod formation such that legs 118 are obliquely oriented relative to longitudinal axis $L_B$, as described in more detail below. In some embodiments, base section 112 may have any suitable number of legs 118 arranged in any suitable formation that enables base section 112 to function as described herein. In other embodiments, tower 102 may not have intermediate section(s) 114 (e.g., tower 102 may only have base section 112 and top section 116). Alternatively, intermediate section(s) 114 and/or top section 116 may not be tubular (e.g., intermediate section(s) 114 and/or top section 116 may also have a plurality of obliquely oriented legs, as described in more detail below).

Figure 2:
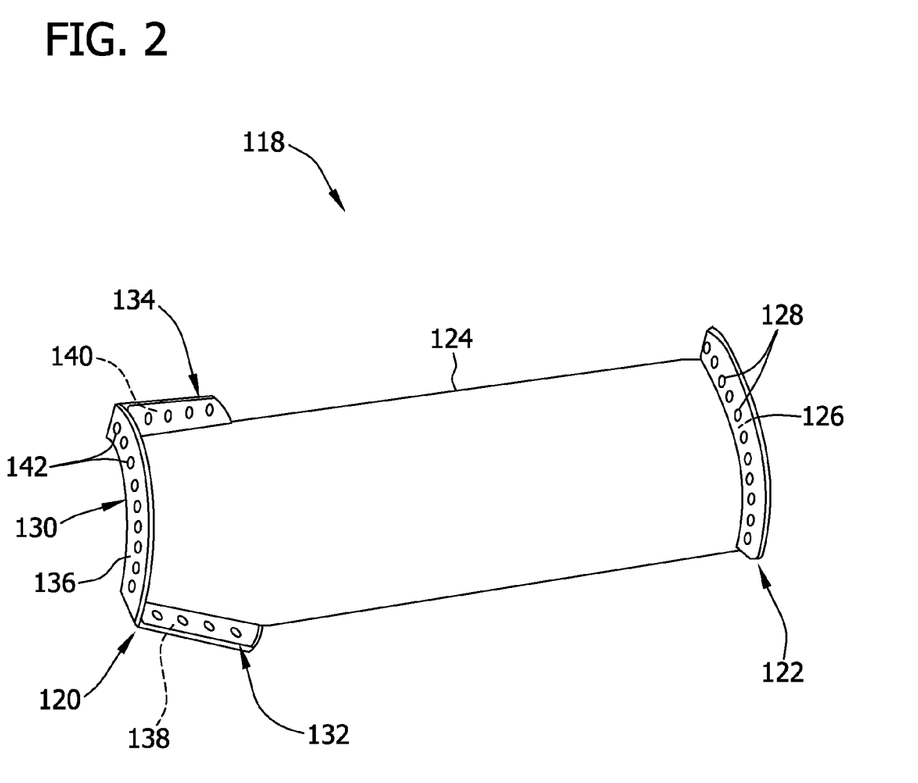
FIG. 2 is a perspective view of a leg of a base section of the wind turbine shown in FIG. 1.
Figure 3:
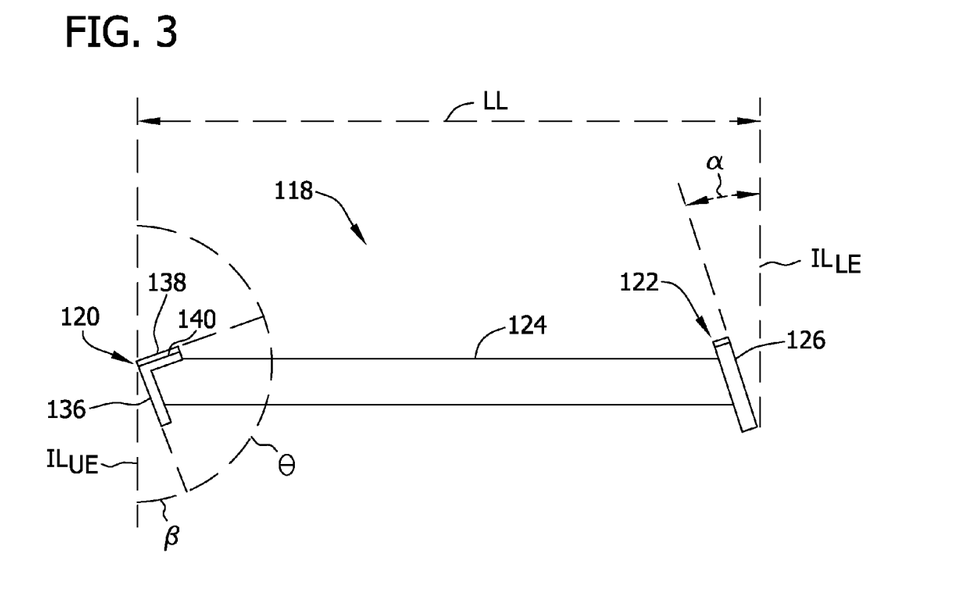
FIG. 3 is a side view of the leg shown in FIG. 2.
Figure 4:
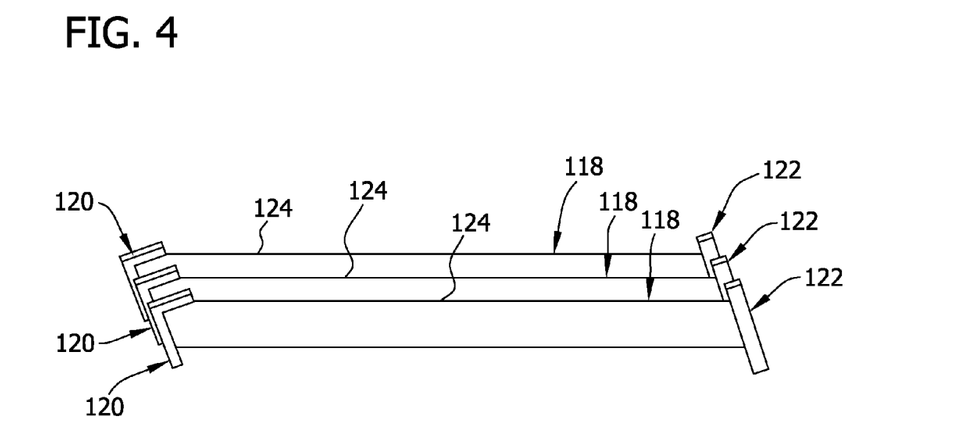
FIG. 4 is a side view of the leg shown in FIG. 2 nested with other legs of the base section of the wind turbine shown in FIG. 1.

FIG. 2 is a perspective view of one of legs 118, and FIG. 3 is a side view of one of legs 118. FIG. 4 is a side view of legs 118 nested together. In the exemplary embodiment, each leg 118 has an upper flange 120, a lower flange 122, and a body 124 extending between upper flange 120 and lower flange 122. Body 124, having a length LL, is arcuately shaped to facilitate strengthening base section 112 and enabling legs 118 to be nested together for easier storage and/or transport of base section 112 (e.g., via rail or vessel). In some embodiments, each body 124 has curvature equal to an angle of about 120° such that bodies 124 would form a completely tubular section (i.e., 360°) if aligned together along their lengths LL. In other embodiments, body 124 may have any suitable shape that enables leg 118 to function as described herein (e.g., body 124 may be v-shaped, u-shaped, or w-shaped, rather than arcuately shaped). In some embodiments, at least one support web may be mounted within body 124 and span the arcuate shape of body 124 to facilitate internally supporting body 124 (e.g., a plurality of support webs may be internally spaced along length LL of body 124 for added support).

In the exemplary embodiment, lower flange 122 has a mating surface 126 and a plurality of fastener apertures 128 (e.g., bolt holes). Lower flange 122 is coupled to and extends radially outward from body 124 such that mating surface 126 is oriented at an acute angle α relative to an imaginary lower end line $IL_{LE}$ that is substantially perpendicular to length LL of body 124. In the exemplary embodiment, upper flange 120 has a top segment 130, a first side segment 132, and a second side segment 134 that are integrally formed (e.g., die cast) together, and each segment 130, 132, 134 has a mating surface 136, 138, 140, respectively, and a plurality of fastener apertures 142 (e.g., bolt holes). Side segments 132, 134 extend from opposing ends of top segment 130 such that mating surfaces 138, 140 are oriented relative to mating surface 136 at an angle θ that is about 90°. Additionally, upper flange 120 is coupled to body 124 such that top segment 130 extends radially outward from body 124 with mating surface 136 oriented at an acute angle β relative to an imaginary upper end line $IL_{UE}$ that is substantially perpendicular to length LL of body 124. Angle α and angle β are the same in the exemplary embodiment. However, angle α and angle β may be different in another embodiment.

In some embodiments, flanges 120, 122 may extend radially inward, rather than radially outward. In other embodiments, body 124 and flanges 120, 122 may be fabricated from a metallic material and welded together (e.g., body 124 may be stamped from a single sheet of steel material, cut from a tube of steel material, or assembled from individually rolled segments of steel material that vary in thickness and are circumferentially welded together for stress optimization). Alternatively, body 124 and/or flanges 120, 122 may be fabricated from any suitable material, in any suitable manner, and in any suitable configuration (e.g., segments 130, 132, 134 of upper flange 120 may be formed separately from one another and coupled together rather than being integrally formed, or legs 118 may not be configured for nesting with one another).

Figure 5:
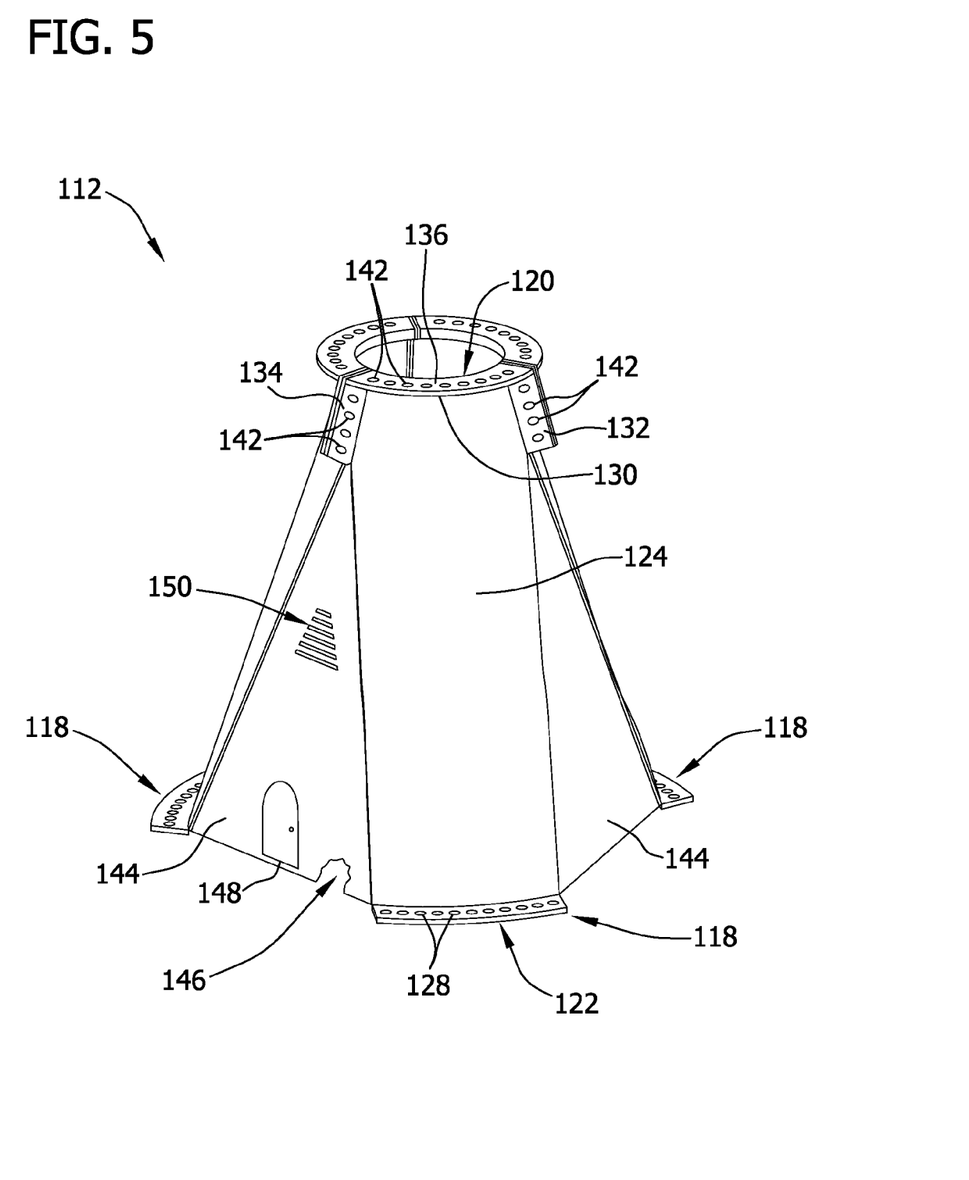
FIG. 5 is a perspective view of the base section of the wind turbine shown in FIG. 1.
Figure 6:
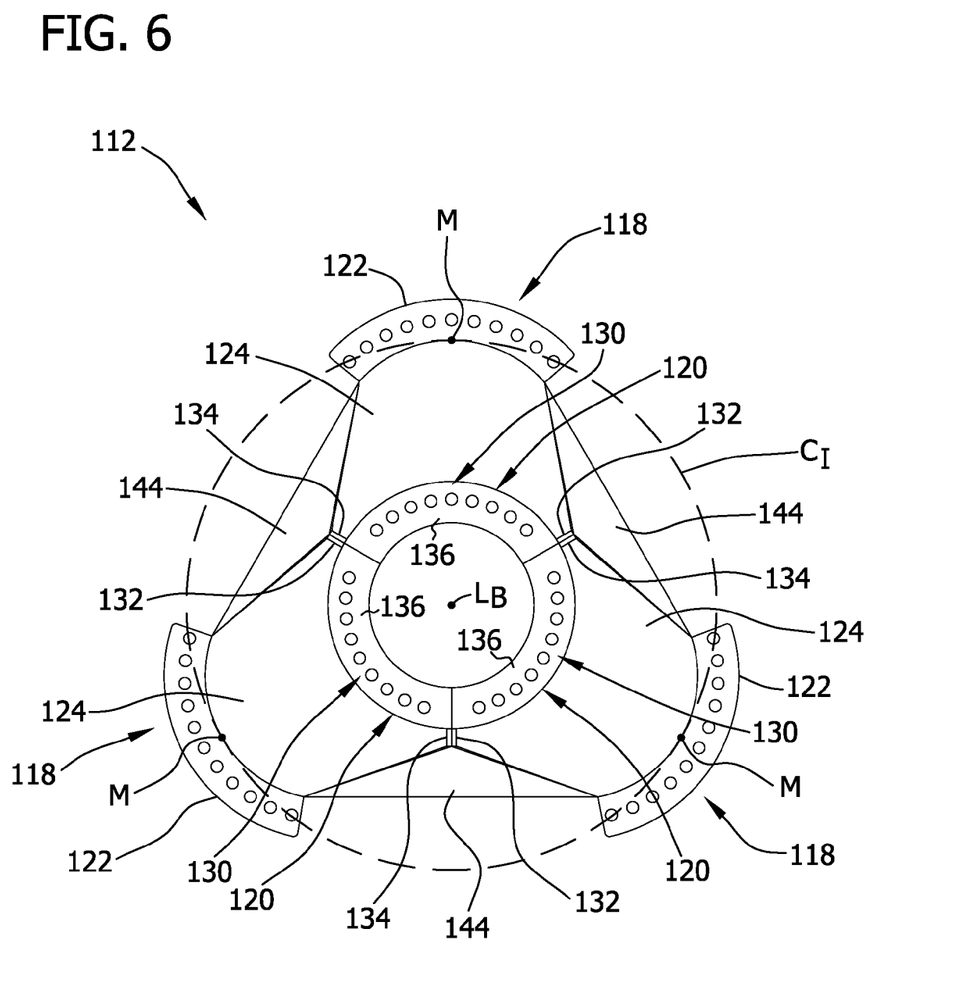
FIG. 6 is a top view of the base section shown in FIG. 5.

FIGS. 5 and 6 are perspective and top views, respectively, of base section 112 in an assembled configuration. In the exemplary embodiment, base section 112 has three legs 118 coupled together such that mating surface 138 of each leg 118 is fastened to mating surface 140 of an adjacent leg 118 via fasteners (e.g., bolts) inserted through at least some of fastener apertures 142. Because mating surfaces 138, 140 are oriented relative to mating surface 136 at angle θ that is about 90°, legs 118 extend downward and outward in a tripod formation when upper flanges 120 are coupled together. Also, because mating surfaces 126 of lower flanges 122 and mating surfaces 136 of upper flanges 120 are oriented at the same acute angles α and β, respectively, mating surfaces 126 can be seated on foundation 104 with mating surfaces 136 forming an interface (e.g., a generally annular interface) on a substantially common plane that is substantially perpendicular to longitudinal axis $L_B$ (i.e., legs 118 are obliquely oriented relative to longitudinal axis $L_B$ at the interface). Thus, an imaginary base circle $C_I$ can be drawn through midpoints M of arcuate bodies 124 near lower flanges 122 to define a footprint of base section 112, and the curvature of each body 124 proximate to lower flange 122 is greater than the curvature of imaginary base circle $C_I$, which increases the structural integrity of base section 112. In other embodiments, the interface formed by mating surfaces 136 may be any suitable shape.

In some embodiments, angle α, angle β, and/or the oblique angle of legs 118 relative to longitudinal axis $L_B$ may be selected in accordance with structural considerations of tower 102 such as, for example, the height of tower 102 and/or the environment in which wind turbine 100 is to be operated. Additionally, while legs 118 are not coupled together other than at upper flanges 120 in the exemplary embodiment, legs 118 may be coupled together at any suitable location in other embodiments to facilitate strengthening base section 112 (e.g., legs 118 may be coupled together via cross-bracing member(s) 311 (FIG. 9) positioned at any desired location on bodies 124, in addition to being coupled together at upper flanges 120). Alternatively, legs 118 may be coupled together in any suitable configuration and mounted on any suitable foundation in any suitable manner.

In the exemplary embodiment, a plurality of covers 144 are coupled to legs 118 to cover gaps 146 (shown in part via a cutout of cover 144 in FIG. 5) formed between adjacent legs 118 (e.g., the exemplary base section 112 has three triangularly shaped gaps 146 and three correspondingly shaped covers 144 for covering gaps 146). Covers 144 are removably coupled to legs 118 to facilitate opening and closing gaps 146 as desired, and covers 144 are not configured to strengthen base section 112 (i.e., covers 144 are configured for removal without jeopardizing the structural integrity of base section 112). Additionally, at least one cover 144 has a door 148 (e.g., a door sized for walking therethrough or a door sized for driving a vehicle therethrough) that provides access into tower 102 (e.g., for maintenance) and/or a vent 150 that facilitates permitting airflow into and/or out of tower 102 (e.g., for releasing heat from within tower 102). Door 148 and/or vent 150 are located on cover(s) 144, rather than on legs 118, such that door 148 and/or vent 150 do not detract from the overall structural integrity of base section 112. However, covers 144 may alternatively be configured to contribute to the structural integrity of base section 112 in other embodiments, meaning that covers 144 may not be configured for removal after installation. Additionally, door 148 and/or vent 150 may be located on legs 118, rather than covers 144, in some embodiments.

Because gaps 146 between adjacent legs 118 are large and because covers 144 are removable, operational equipment of wind turbine 100 may be more completely assembled outside of tower 102 and moved into tower 102 through gaps 146 after tower 102 has been at least partially erected and when one of covers 144 is removed, thereby enabling easier installation and maintenance of the operational equipment (e.g., the "down-tower" electrical equipment may be more completely assembled outside of base section 112 and driven through one of gaps 146 on a truck for installation in base section 112, in addition to the down-tower electrical equipment being removable from base section 112 in larger sub-assemblies for maintenance outside of base section 112). In another embodiment, base section 112 may not include covers 144 but, rather, may include an internal covering over the down-tower electrical equipment and/or other operational equipment. In some embodiments, covers 144 may be fabricated from a fiberglass material, a fabric material, or a corrugated sheet metal material. In other embodiments, covers 144 and gaps 146 may be any suitable size or shape, and covers 144 may have any suitable configuration.

Figure 7:
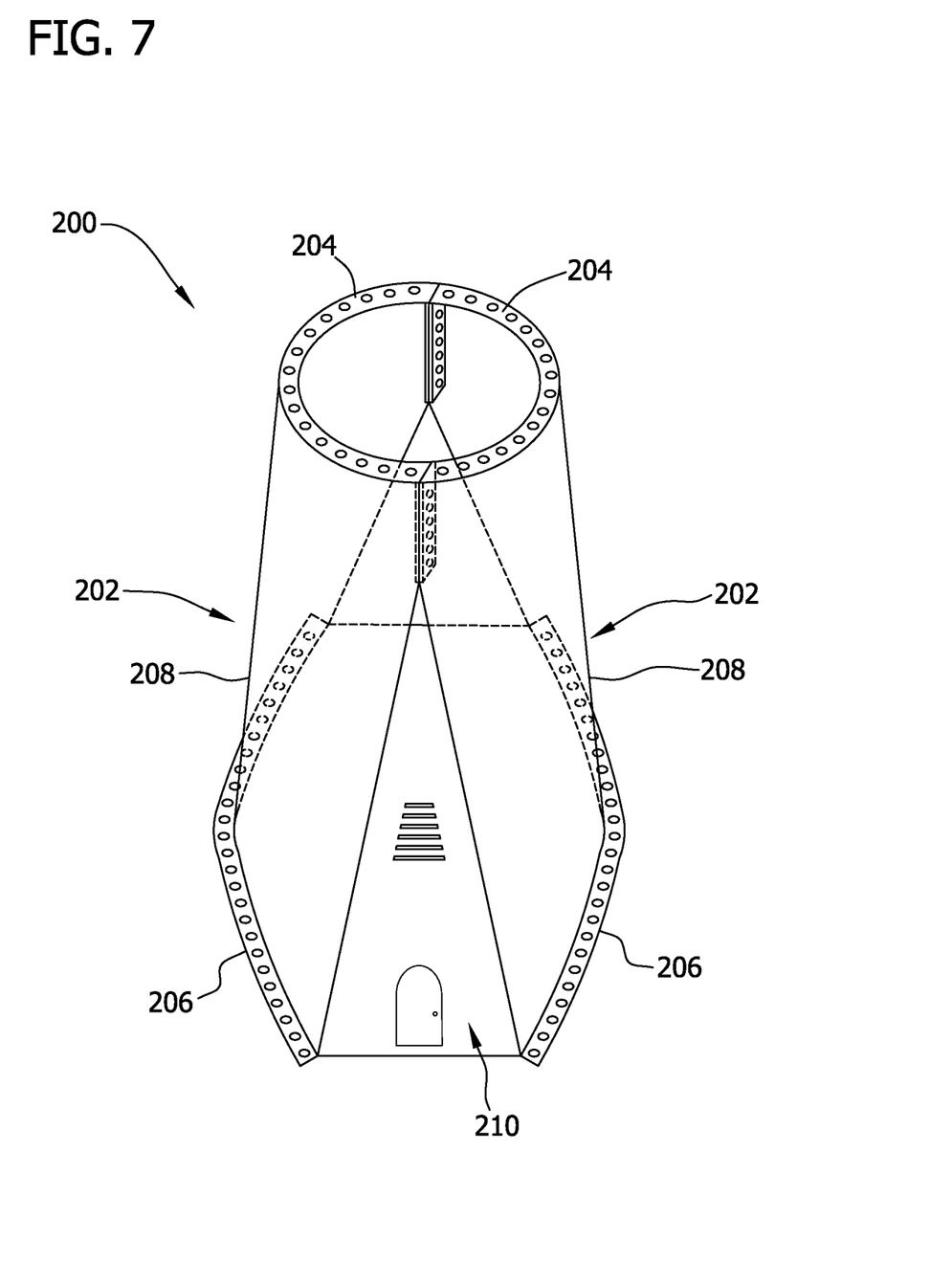
FIG. 7 is a perspective view of another base section for use in the wind turbine shown in FIG. 1.
Figure 8:
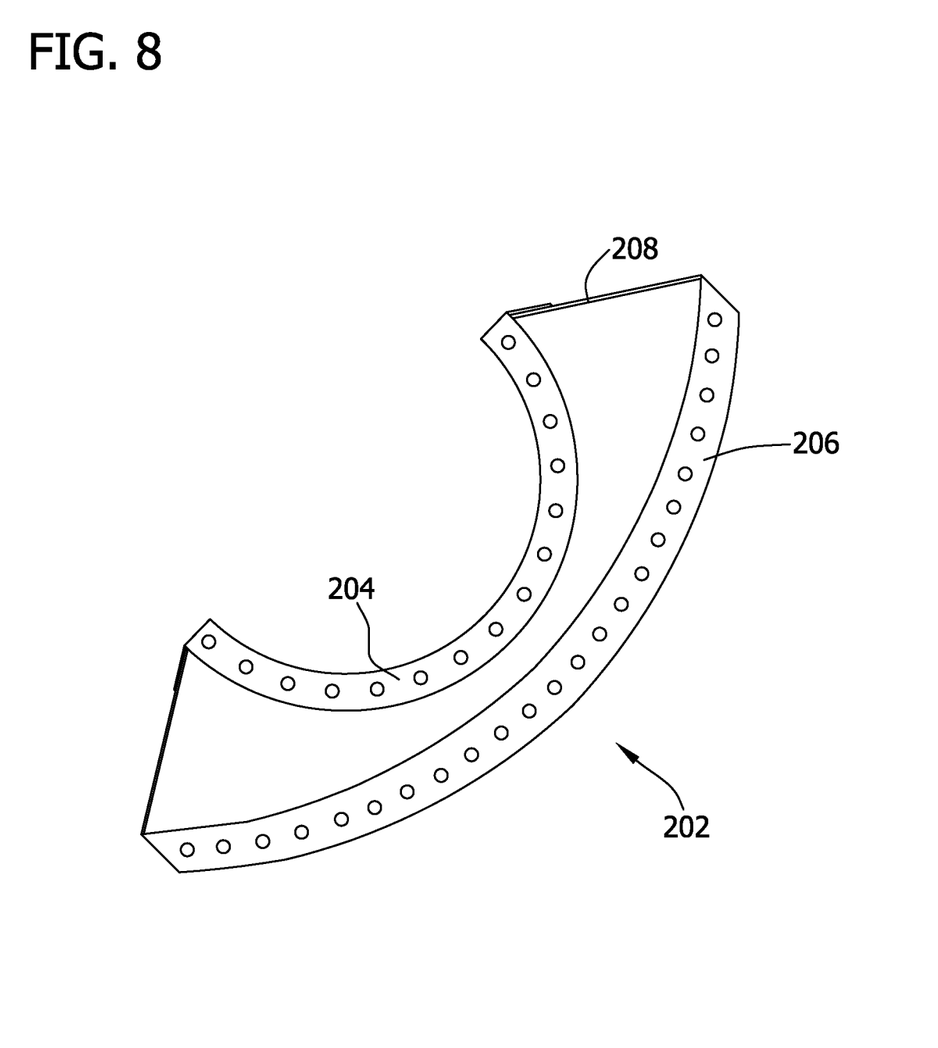
FIG. 8 is a top view of a leg of the base section shown in FIG. 7.

FIG. 7 is a perspective view of another base section 200 for use in wind turbine tower 102, and FIG. 8 is a top view of a leg 202 of base section 200. Base section 200 is similar to base section 112. However, base section 200 has a pair of legs 202 arranged in a bipod formation. Covers 210, similar to covers 144 of FIGS. 5 and 6, are coupled between legs 202. In this embodiment, each leg 202 has an upper flange 204, a lower flange 206, and a body 208 extending between upper flange 204 and lower flange 206. Flanges 204, 206 are similar to flanges 120, 122 of FIGS. 2-6. While upper flanges 204 extend radially inward from body 208, upper flanges 204 may suitably extend radially outward from body 208 in other embodiments. In this embodiment, bodies 208 are curved and flared near lower flanges 206 (e.g., legs 202 are wider and have less curvature near lower flanges 206) to increase the structural integrity of base section 200 (e.g., bodies 208, when coupled together, form a substantially elliptical shape near lower flanges 206 and a substantially circular shape near upper flanges 204 such that the spread of legs 202 is increased for added support). In other embodiments, bodies 208 may have substantially the same semi-circular or semi-elliptical curvature near upper flange 204 and lower flange 206. Alternatively, legs 202 may have any desired curvature.

Figure 9:
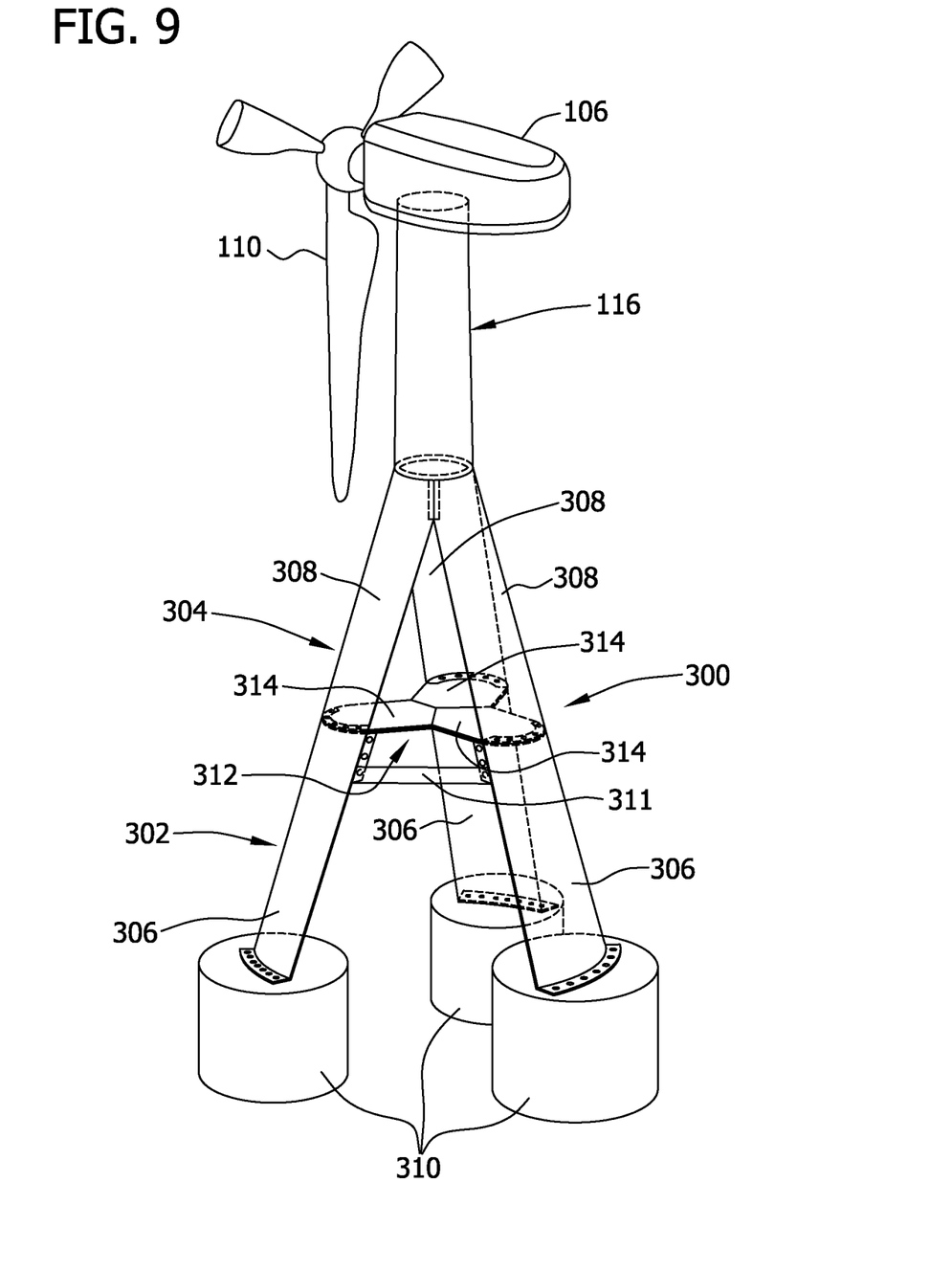
FIG. 9 is a perspective view of another base section for use in the wind turbine shown in FIG. 1.

FIG. 9 is a perspective view of another base section 300 for use in wind turbine 100. Base section 300 is similar to base section 112. However, base section 300 has a lower tier 302 and an upper tier 304 atop of lower tier 302. Lower tier 302 has three legs 306, and upper tier 304 has three legs 308. Legs 306, 308 are similar to legs 118 of FIGS. 2-6. Each leg 306 is mounted on an individual concrete pile 310 (e.g., via lower flanges 122 of legs 306) to facilitate reducing the risk of cracking that may be associated with a single, large concrete slab, and each leg 308 is coupled atop a respective one of legs 306. Legs 308 are coupled to one another in a manner similar to legs 118 of FIGS. 2-6 (e.g., legs 308 may be coupled to one another at upper flanges 120 of legs 308, and legs 308 may be mounted on legs 306 by coupling lower flanges 122 of legs 308 to upper flanges 120 of legs 306 via bolts inserted through aligned fastener apertures 128, 142). In some embodiments, lower tier 302 and upper tier 304 may have any suitable number of legs (e.g., base section 300 may not be arranged in a tripod formation). In other embodiments, wind turbine 100 may be erected offshore, and concrete piles 310 may be at least partially submerged (e.g., built into the seabed) and configured at an angle relative to one another (e.g., each concrete pile 310 may be oriented at substantially the same angle as the leg 306 mounted thereon, with a bridging brace spanning base section 300 and connecting legs 306 together near the tops of piles 310). Alternatively, base section 300 may have any suitable number of tiers (e.g., base section 300 may have a lower tier, at least one intermediate tier, and an upper tier that each has a plurality of legs).

In this embodiment, a platform 312 is coupled between lower tier 302 and upper tier 304 to facilitate reinforcing base section 300 and to facilitate providing a surface upon which to perform maintenance on tower 102. Platform 312 has three segments 314 that are detachably coupled together via any suitable coupling device (e.g., a lap joint). In one embodiment, each segment 314 may be coupled to a respective one of lower legs 306 prior to each lower leg 306 being mounted on one of concrete piles 310, prior to segments 314 being coupled together, and prior to assembling upper tier 304 on lower tier 302. In another embodiment, lower legs 306 may first be mounted on concrete piles 310, and platform 312 may then be mounted onto lower legs 306 (e.g., via a crane) after segments 314 have already been coupled together and prior to assembling upper tier 304 on lower tier 302. Alternative methods of assembly may also be used.

This segmented configuration facilitates easier storage and/or transport of platform 312 (e.g., platform 312 may be stored and/or transported in a disassembled condition and assembled on site). In some embodiments, base section 300 may have any suitable number of platforms 312, and platforms 312 may be mounted at any suitable location. In other embodiments, platform 312 may have any suitable number of segments 314 arranged in any suitable manner. Alternatively, any suitable cross-bracing member(s) 311 may be used in lieu of, or in combination with, platform 312 (e.g., as shown in FIG. 9, cross-bracing member(s) 311 may be bolted between legs 306 and/or 308 and may be fabricated in a channel or C-beam configuration using steel, or cross-bracing members 311 may be arranged in a lattice formation between legs 306 and/or 308 in other embodiments). Additionally, covers similar to covers 144 of FIGS. 5 and 6 may be coupled to lower legs 306 and/or upper legs 308 to cover gaps as desired. It should also be recognized that, while individual concrete piles 310, cross-bracing members 311, and platform(s) 312 are described herein as being useful in this tiered base section 300, similar concrete piles 310 and/or platform(s) 312 may also be used with the other embodiments described herein.

Figure 10:
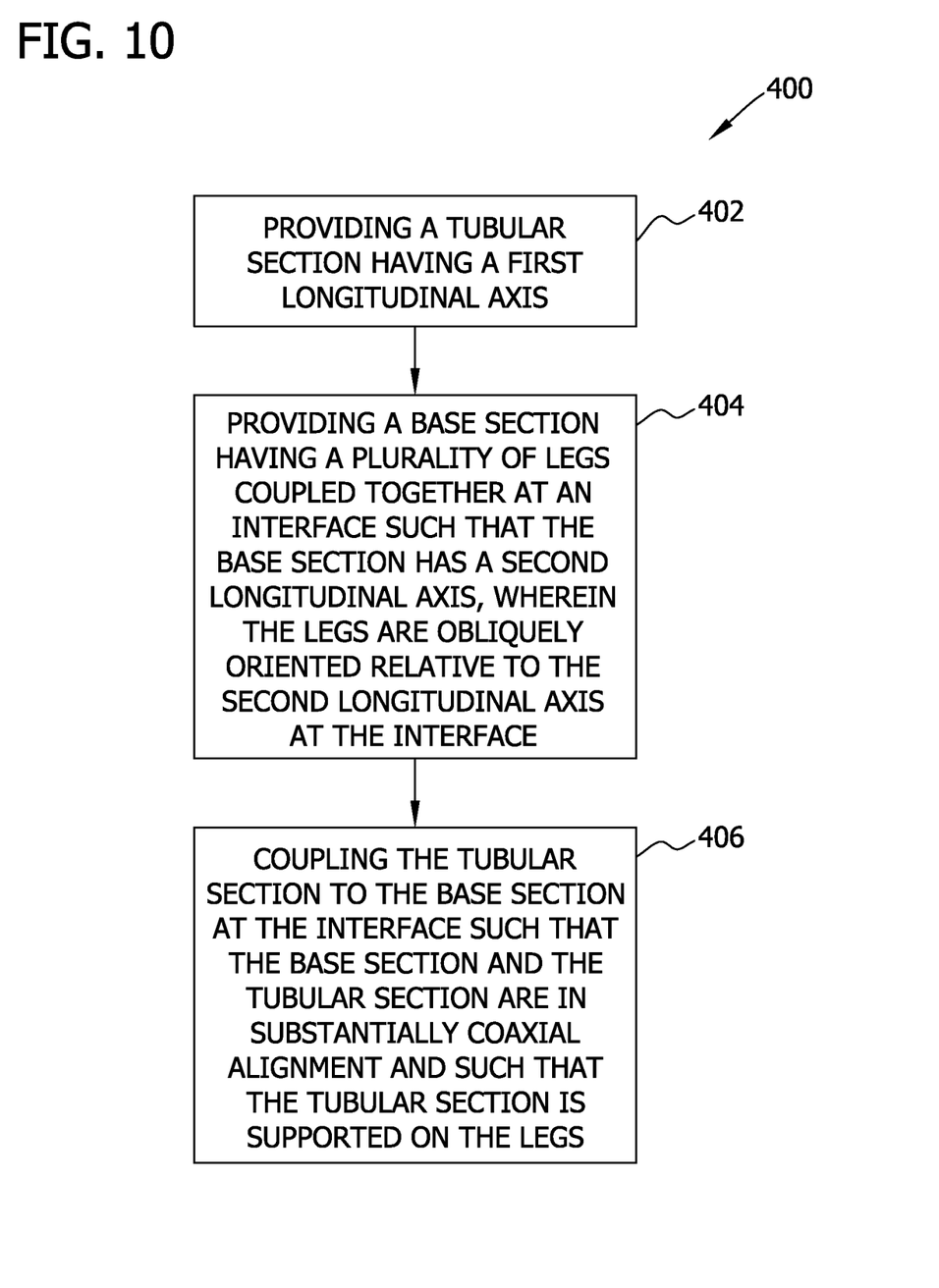
FIG. 10 is a flow chart of a method for assembling a tower of the wind turbine shown in FIG. 1.

FIG. 10 is a flow chart of a method 400 for assembling a wind turbine tower. Method 400 includes providing 402 a tubular section having a first longitudinal axis and providing 404 a base section having a plurality of legs coupled together at an interface such that the base section has a second longitudinal axis, wherein the legs are obliquely oriented relative to the second longitudinal axis at the interface. Method 400 further includes coupling 406 the tubular section to the base section at the interface such that the base section and the tubular section are in substantially coaxial alignment and such that the tubular section is supported on the legs.

In one embodiment, method 400 may also include arranging the legs in a tripod formation. In another embodiment, method 400 may include arranging the legs in a bipod formation. In some embodiments, method 400 may include embedding each of the legs in an individual concrete pile. In other embodiments, method 400 may include coupling a removable cover over a gap between a pair of the legs. In one alternative embodiment, method 400 may include assembling a first tier of the base section using the legs, assembling a second tier of the base section on the first tier using the legs, and mounting a platform between the first tier and the second tier. In another alternative embodiment, method 400 may include coupling a plurality of platform segments together to form the platform.

The methods and systems described herein facilitate providing a wind turbine tower having a base section that is configured to withstand the increased loading associated with larger towers. The methods and systems described herein also facilitate providing a wind turbine tower having a base section with legs that can be more easily and cheaply packaged and/or transported to the site at which the tower is to be erected (e.g., each individual leg or each set of nested legs can fit into a 4.3 m by 4.3 m shipping envelope, thereby reducing a cost associated with transporting the base section). The methods and systems described herein further facilitate providing a wind turbine tower having a base section that can be manufactured using less material, thereby decreasing a manufacturing cost associated with fabricating the tower. Additionally, the methods and systems described herein facilitate providing a wind turbine tower with a base section that enables down-tower electronic equipment, as well as other operational equipment, to be more completely assembled outside of the base section and moved into the base section after the base section has been installed, in addition to facilitating removal of the equipment from the base section in larger sub-assemblies for maintenance, with less disassembly of the equipment having to occur within the base section, thereby reducing time and costs associated with assembling and maintaining the wind turbine. Thus, the methods and systems described herein facilitate reducing costs associated with manufacturing, assembling, transporting, and/or maintaining a wind turbine.

Exemplary embodiments of a wind turbine tower assembly and a method for assembling the same are described above in detail. The methods and systems described herein are not limited to the specific embodiments described herein, but, rather, components of the systems and/or steps of the methods may be utilized independently and separately from other components and/or steps described herein. For example, the methods and systems described herein may have other applications not limited to practice with wind turbines, as described herein. Rather, the methods and systems described herein can be implemented and utilized in connection with various other industries.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine tower assembly, comprising:
    a tubular section having a first longitudinal axis; and,
    a base section assembly comprising a plurality of legs, said base section assembly configured to be assembled into a base section having said legs coupled against one another to define an interface such that the base section has a second longitudinal axis and such that said legs are obliquely oriented relative to the second longitudinal axis at the interface, wherein the base section is configured to support said tubular section on said legs and in substantially coaxial alignment with the base section, and wherein each of said legs comprises an upper flange, a lower flange, and a body extending between said upper flange and said lower flange.

2. A wind turbine tower assembly in accordance with claim 1, wherein said legs comprise three legs configured to be arranged in a tripod formation.

3. A wind turbine tower assembly in accordance with claim 1, wherein said legs comprise two legs configured to be arranged in a bipod formation.

4. A wind turbine tower assembly in accordance with claim 1, wherein said legs are configured to be nested together.

5. A wind turbine tower assembly in accordance with claim 1, wherein said base section assembly further comprises a cover configured to be removably coupled over a gap between a pair of said legs.

6. A wind turbine tower assembly in accordance with claim 5, wherein said cover comprises at least one of a drive-through door and a vent.

7. A wind turbine tower assembly in accordance with claim 1, wherein said legs comprise:
    a plurality of lower legs configured for a lower tier of the base section; and,
    a plurality of upper legs configured for an upper tier of the base section, said base section assembly further comprising at least one cross-bracing member and a platform assembly configured to be assembled into a platform for mounting between said upper legs and said lower legs.

8. A wind turbine tower assembly in accordance with claim 7, wherein said platform assembly comprises a plurality of platform segments configured to be detachably coupled together.

9. A method for assembling a wind turbine tower, said method comprising:
    providing a tubular section having a first longitudinal axis;
    providing a base section having a plurality of legs coupled against one another to define an interface such that the base section has a second longitudinal axis, wherein each of the legs includes an upper flange, a lower flange, and a body extending between the upper flange and the lower flange, and wherein the legs are obliquely oriented relative to the second longitudinal axis at the interface; and,
    coupling the tubular section to the base section at the interface such that the base section and the tubular section are in substantially coaxial alignment and such that the tubular section is supported on the legs.

10. A method in accordance with claim 9, further comprising arranging the legs in a tripod formation.

11. A method in accordance with claim 9, further comprising arranging the legs in a bipod formation.

12. A method in accordance with claim 9, further comprising embedding each of the legs in an individual concrete pile.

13. A method in accordance with claim 9, further comprising coupling a removable cover over a gap between a pair of the legs.

14. A method in accordance with claim 9, further comprising:
    assembling a first tier of the base section using the legs;
    assembling a second tier of the base section on the first tier using the legs; and,
    mounting a platform between the first tier and the second tier.

15. A method in accordance with claim 14, further comprising coupling a plurality of platform segments together to form the platform.

16. A base section assembly for a wind turbine tower having a tubular section with a first longitudinal axis, said base section assembly comprising:
    a plurality of legs, said base section assembly configured to be assembled into a base section having said legs coupled against one another to define an interface such that the base section has a second longitudinal axis and such that said legs are obliquely oriented relative to the second longitudinal axis at the interface, wherein the base section is configured to support the tubular section on said legs and in substantially coaxial alignment with the base section, and wherein each of said legs comprises an upper flange, a lower flange, and a body extending between said upper flange and said lower flange.

17. A base section assembly in accordance with claim 16, wherein said legs comprise three legs configured to be arranged in a tripod formation.

18. A base section assembly in accordance with claim 16, wherein said legs comprise two legs configured to be arranged in a bipod formation.

\* \* \* \* \*